(12) United States Patent
Wang et al.

(10) Patent No.: US 11,902,097 B2
(45) Date of Patent: *Feb. 13, 2024

(54) ADAPTIVE LOCATION-BASED SD-WAN POLICIES

(71) Applicant: Juniper Networks, Inc., Sunnyvale, CA (US)

(72) Inventors: Jisheng Wang, Palo Alto, CA (US); Ruchit Rajkumar Mehta, Emeryville, CA (US); Kaushik Adesh Agrawal, Chelmsford, MA (US); Patrick Timmons, Newton, MA (US); Patrick J. McLampy, Dunstable, MA (US); Michael Baj, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,461

(22) Filed: Apr. 24, 2023

(65) Prior Publication Data
US 2023/0261945 A1 Aug. 17, 2023

Related U.S. Application Data

(63) Continuation of application No. 17/452,962, filed on Oct. 29, 2021, now Pat. No. 11,637,753.

(51) Int. Cl.
*G06F 15/173* (2006.01)
*H04L 41/0893* (2022.01)
*H04L 41/16* (2022.01)
*H04L 41/5009* (2022.01)

(52) U.S. Cl.
CPC .......... *H04L 41/0893* (2013.01); *H04L 41/16* (2013.01); *H04L 41/5009* (2013.01)

(58) Field of Classification Search
CPC .. H04L 41/0893; H04L 41/16; H04L 41/5009
See application file for complete search history.

(56) References Cited

U.S. PATENT DOCUMENTS

| 11,381,474 B1 | 7/2022 | Kumar et al. |
| 11,637,753 B1 | 4/2023 | Wang et al. |
| 2019/0036816 A1 | 1/2019 | Evans et al. |

FOREIGN PATENT DOCUMENTS

EP 3654589 A1 5/2020

OTHER PUBLICATIONS

Awad et al., "Machine Learning-Based Multipath Routing for Software Defined Networks", Journal of Network and Systems Management, vol. 29, No. 02, Jan. 2021, 30 pp.
Extended Search Report from counterpart European Application No. 22152592.6 dated Jul. 8, 2022, 11 pp.
(Continued)

*Primary Examiner* — Joseph R Maniwang
(74) *Attorney, Agent, or Firm* — Shumaker & Sieffert, P.A.

(57) ABSTRACT

An example method includes receiving, by an SD-WAN system, WAN link characterization data for a plurality of WAN links of the SD-WAN system over a time period; and for each site of a plurality of sites of the SD-WAN system, generating, by the SD-WAN system, a local policy for the site, wherein generating the local policy is based on a machine learning model trained with the WAN link characterization data for the plurality of WAN links, and providing the local policy to an SD-WAN edge device of the site.

20 Claims, 7 Drawing Sheets

(56) References Cited

OTHER PUBLICATIONS

Guo et al., "Hybrid.Flow: Achieving Load Balancing in Software-Defined WANs With Scalable Routing", IEEE Transactions on Communications, vol. 69, No. 08, IEEE, Apr. 2021, pp. 5258-5263.
Kaloxylos et al., "AI and ML—Enablers for Beyond 5G Networks", 5G PPP Technology Board, Dec. 2020, 145 pp.
Prosecution History from U.S. Appl. No. 17/452,962, dated Jul. 15, 2022 through Mar. 8, 2023, 44 pp.
Xu et al., "Tomography Based Learning for Load Distribution Through Opaque Networks", IEEE Open Journal of the Communications Society, vol. 02, IEEE, Mar. 2021, pp. 656-670.
Response to Extended Search Report dated Jul. 8, 2022, from counterpart European Application No. 22152592.6 filed Nov. 2, 2023, 21 pp.

ADAPTIVE LOCATION-BASED SD-WAN POLICIES

This application is a continuation of U.S. patent application Ser. No. 17/452,962, filed 29 Oct. 2021, the entire contents of which is incorporated herein by reference.

TECHNICAL FIELD

The disclosure relates to computer networks and, more specifically, to adaptive location based policies for a software-defined wide area network (SD-WAN) device.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and enterprises may use a software-defined wide area network (SD-WAN) to manage network connectivity among distributed locations, such as remote branches, central offices, or data centers. SD-WAN extends software-defined networks (SDNs) to enable businesses to create connections quickly and efficiently over a WAN. A WAN may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

An SD-WAN service enables users, such as enterprises, to use the WAN links to meet business and customer needs. In an SD-WAN environment, low-priority traffic can use the lower-cost Internet-based WAN link(s), while more important traffic can travel across better quality WAN links (such as those provided by an MPLS network). WAN link usage can also be assigned per application. With an SD-WAN solution, an enterprise customer can mix and match cost optimization with SLA requirements as they see fit. Users may expect their applications to experience connectivity having an acceptable level of quality, commonly referred to as Quality of Experience (QoE). The QoE may be measured based on various performance metrics of a link, including latency, delay (inter frame gap), jitter, packet loss, and/or throughput. The user may define desired levels for one or more of the metrics for the QoE that the users expect in service contracts, e.g., service level agreements (SLAs), with the service provider. SLA metrics are typically user configurable values and are derived through trial-and-error methodologies or benchmark test environment versus user experience or realistic best application metrics.

SUMMARY

In general, the disclosure describes techniques for generating site specific local policies for an SD-WAN edge device within an SD-WAN system. The local policies can be initially generated from a global policy for an SD-WAN operator or customer and can be adjusted over time as network conditions or configurations change for a site. The local policy can be tailored to the SD-WAN edge device based on performance aspects of WAN links that provide connectivity to SD-WAN edge devices, and/or costs associated with the WAN links.

In some aspects of this disclosure, a machine-learning engine can receive performance metrics from physical network devices that are used to provide network connectivity for SD-WAN edge devices. For example, an SD-WAN edge device may be configured to utilize a broadband network or a mobile network (e.g., a 5G or LTE network). The machine-learning engine can receive performance data for the broadband network and the mobile network from SD-WAN edge devices and routers on the respective networks. In some aspects, SD-WAN edge devices, and optionally intermediate routers between SD-WAN edge devices, may provide periodic telemetry updates to the machine-learning engine. The telemetry updates can include WAN link characterization data such as performance metrics for the WAN links available for use by SD-WAN edge devices, link types of the WAN links, site identifiers of the site providing the telemetry data etc. The performance metrics can include jitter, latency, packet loss, etc. The WAN link characterization data may further include data such as link type data, maximum transmission unit (MTU), link cost data, and/or location data for a site.

The machine learning engine may then use WAN link characterization data for the SD-WAN edge devices at a site to automatically generate or update a local policy for the site so as to optimize network path selection, traffic steering, network performance, adherence to an SLA, etc., for a particular SD-WAN edge device at the site or location. The optimization can be based on performance, cost, or a combination of both performance and cost. The local policy for a site may be periodically adjusted based on changing network conditions and performance.

The techniques disclosed herein may be included in a practical application that provides technical advantages over existing systems. For example, an SD-WAN customer may have hundreds or thousands of sites that are part of the SD-WAN. In existing systems, a global policy is typically provided to each SD-WAN edge device, where the global policy is the same for each of the customer's SD-WAN edge devices. However, such a "one size fits all" approach may fail to consider differences in network hardware, WAN link performance, and WAN link costs at the various sites. As an example, a global policy may specify that a broadband network is preferred over an LTE network based on the assumption that a broadband network has better performance at a lower cost than an LTE network. While this assumption may be correct for some sites, there may be other sites where the performance and/or cost of the local LTE network is better than a broadband network available to the site. Thus, in this case, a local policy may be generated that specifies that the LTE network is preferred over a broadband network. Thus, the techniques described herein provide a technical advantage over existing systems. For example, the techniques described herein generate a local site policy that may lower the network operational costs for a site and/or increase network performance for a site when compared to existing systems.

Additionally, the techniques disclosed herein can generate a local policy that can be optimized for the network hardware, WAN link performance and/or WAN link costs at a particular site, thereby providing a technical advantage over existing systems. A further technical advantage is that the local polices can be updated as network performance for a site changes over time.

In one example, this disclosure describes a method that includes receiving, by an SD-WAN system, WAN link characterization data for a plurality of WAN links of the SD-WAN system over a time period; and for each site of a plurality of sites of the SD-WAN system, generating, by the SD-WAN system, a local policy for the site, wherein generating the local policy is based on a machine learning model trained with the WAN link characterization data for the plurality of WAN links, and providing the local policy to an SD-WAN edge device of the site.

In another example, an SD-WAN system includes a network analysis system comprising processing circuitry configured to: receive WAN link characterization data for a plurality of WAN links of the SD-WAN system over a time period, and for each site of a plurality of sites of the SD-WAN system, generate a local policy for the site based on a machine learning model trained with the WAN link characterization data for the plurality of WAN links, and provide the local policy to an SD-WAN edge device of the site; and the SD-WAN edge device comprising processing circuitry configured to: receive the local policy, and assign, based on the local policy, a service or application to a WAN link.

In another example, an SD-WAN edge device includes one or more processors; and a memory storing instructions, that when executed, cause the one or more processors to: receive, from a network analysis system, a machine learning model trained with WAN link characterization data for a plurality of WAN links of a plurality of sites, generate a local policy for the SD-WAN edge device based on the machine learning model, and assign, based on the local policy, a service or application of the SD-WAN edge device to a WAN link.

The details of one or more examples are set forth in the accompanying drawings and the description below. Other features, objects, and advantages will be apparent from the description and drawings, and from the claims.

DETAILED DESCRIPTION

Figure 1:
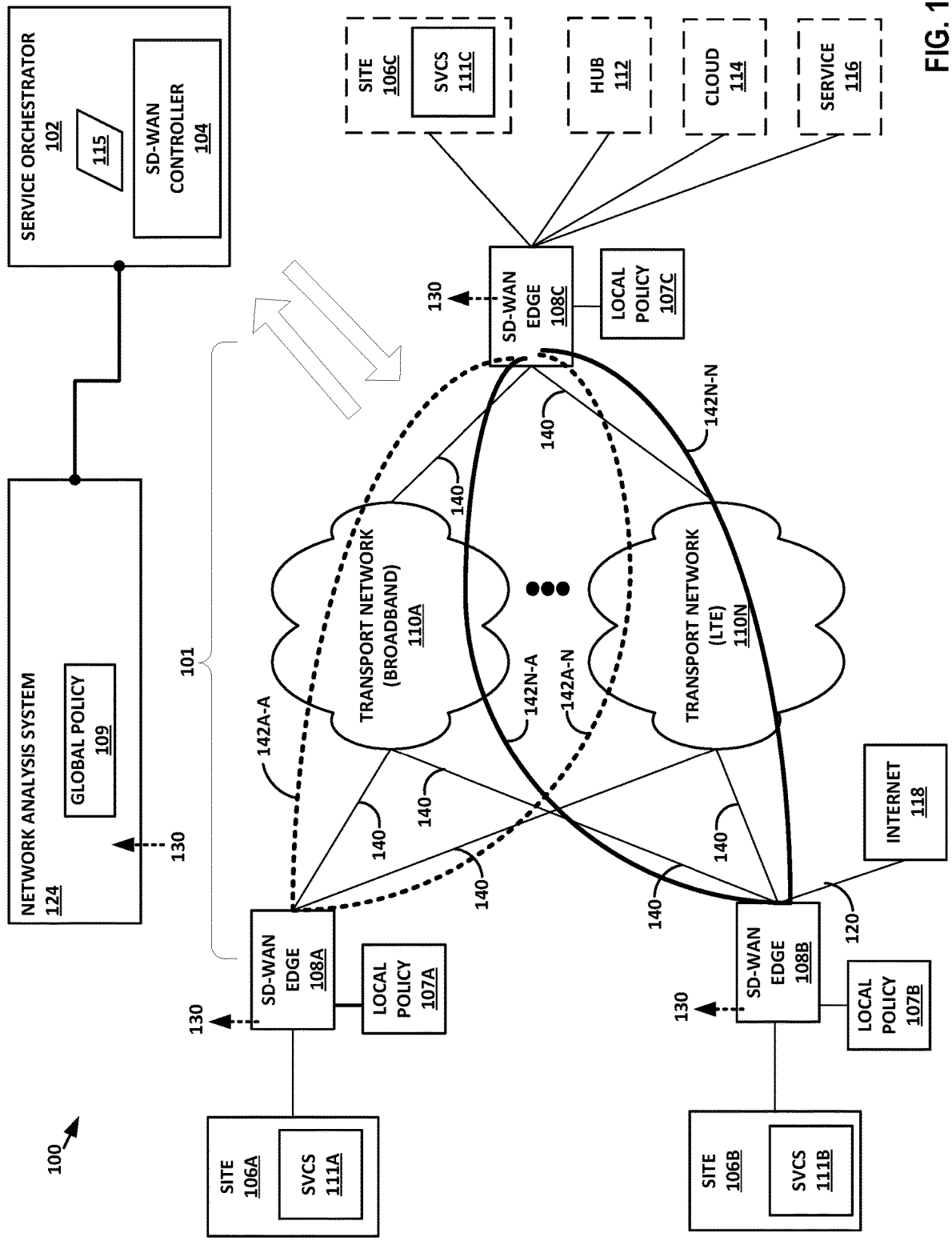
FIG. 1 is a block diagram illustrating an example software-defined wide area network (SD-WAN) system implemented in a network, in accordance with the techniques of this disclosure.

FIG. 1 is a block diagram illustrating an example software-defined wide area network (SD-WAN) system implemented in a network, in accordance with the techniques of this disclosure. SD-WAN system 100 includes transport networks 110A-110N (collectively, "transport networks 110") for connecting sites attached to transport networks and for transporting network traffic between such attached sites. One or more service providers may deploy transport networks 110, which may therefore alternatively be referred to as "service provider networks." Sites attached to service provider networks may be referred to as "subscriber sites." As used herein, the terms "subscriber," "customer," and "tenant" may be used interchangeably.

A service provider uses SD-WAN system 100 to offer an SD-WAN service 101 to its subscribers or organizations authorized by such subscribers, which may include cloud providers, cloud networks, and subscriber partners for instance. SD-WAN service 101 provides a virtual overlay network that enables application-aware, orchestrated connectivity to deliver IP packets between sites associated with a subscriber according to policies. The service provider may offer multiple SD-WAN services.

SD-WAN system 100 includes service orchestrator 102, SD-WAN controller 104, and multiple SD-WAN edge devices 108A-108C (hereinafter, "SD-WAN edges" and collectively, "SD-WAN edges 108") that implement SD-WAN service 101. SD-WAN edges 108 are connected to one another by transport networks 110. Control and ownership of service orchestrator 102, SD-WAN controller 104, SD-WAN edges 108, and transport networks 110 may be distributed among one or more service providers, subscribers, enterprises, or other organizations. However, the SD-WAN service provider uses all of these components to provide the SD-WAN service 101. The SD-WAN service provider may be an enterprise, network/Internet service provider, cloud provider, or other entity.

In general, service orchestrator 102 manages SD-WAN services. Service orchestrator 102 may control, fulfill, configure, monitor usage, assure, analyze, secure, modify, reconfigure, and apply policies to SD-WAN services. Service orchestrator 102 may establish application-based forwarding over transport networks 110 based on security policies, Quality of Service (QoS) policies, QoE policies, and/or business or intent-based policies. These policies may be described as global policies when the policies are applied to all of the sites of a subscriber and may be described as local policies when the policies are applied to one site or a subset of sites of the subscriber. Service orchestrator 102 may contain or represent a Network Service Orchestrator (NSO). Service orchestrator 102 has awareness of resources of network system 100 and may enable, for example: tenant site and service management; end-to-end traffic orchestration, visibility, and monitoring: physical network function (PNF) and/or virtual network function (VNF) management; policy and SLA management (PSLAM) to enable SD-WAN functions; routing management for managing routing operations including creating virtual private networks, enabling routing on SD-WAN edges 108, and interfacing to route reflectors and routers; telemetry services that provide interfaces used by fault monitoring and performing monitoring systems for collecting service check results from telemetry agents; and network activation functions to enable device provisioning. At least some of the above functions may be performed by components of a separate or integrated SD-WAN controller 104.

SD-WAN controller 104 may contain or represent a Network Service Controller (NSC). In general, service orchestrator 102 interacts with SD-WAN controller 104 to manage SD-WAN edges 108 to create and operate end-toend SD-WAN managed services between SD-WAN edges 108 over transport networks 110. SD-WAN controller 104 may provide topology and SD-WAN edge 108 lifecycle management functionality. For example, SD-WAN controller 104 provides PNF/VNF management for SD-WAN edges 108 managed by service orchestrator 102. For example, SD-WAN controller 104 may configure the network configurations of SD-WAN edges 108, configure policies on SD-WAN edges 108, and so forth. SD-WAN controller 104 may monitor statuses and performance data for SD-WAN edges 108 and WAN links 142A-A-142N-N (collectively, "WAN links 142") and provide this information to the service orchestrator 102. In other words, SD-WAN controller 104 may communicate with SD-WAN edges 108 to determine the operational state of WAN links 142 across transport networks 110 and to obtain QoS/QoE performance metrics for WAN links 142. SD-WAN system 100 may, based on the performance metrics for the WAN links, modify traffic patterns to better meet SLA demands for SD-WAN services in network system 100.

In various examples of SD-WAN system 100, service orchestrator 102 and SD-WAN controller 104 may, for example, be combined to form a single service orchestration platform having separate service orchestration and domain orchestration layers, deployed as separate devices or appliances, or each may be distributed among one or more components executing on one or more servers deployed in one or more locations. Service orchestrator 102 may be a scalable and cloud deployable platform. For example, the service provider for SD-WAN services in network system 100 may deploy service orchestrator 102 to a provider site or to a public, private, or hybrid cloud. As such, operations and functions attributed in this disclosure to service orchestrator 102 may be performed by a separate SD-WAN controller 104, and vice-versa. Aspects of service orchestration and SD-WAN control may also be distributed from service orchestrator 102 and SD-WAN controller 104, respectively, among SD-WAN edges 108 in some example architectures.

Administrators and applications may interface with service orchestrator 102 using northbound interfaces such as RESTful interfaces (e.g., web-based REST APIs), command-line interfaces, portal or graphical user interfaces, web-based user interfaces, or other interfaces of service orchestrator 102 (not shown in FIG. 1). Service orchestrator 102 may communicate with SD-WAN controller 104 via a southbound interface, which may be a northbound interface of SD-WAN controller, such as RESTful interfaces, command-line interfaces, graphical user interfaces, or other interfaces of service orchestrator 102 (not shown in FIG. 1).

Network links 140 connect SD-WAN edges 108 to transport networks 110. Network links 140 and transports networks 110 make up the underlay network for the SD-WAN service 101 and offer underlay connections between pairs of SD-WAN edges 108. For example, transport network 110A and transport network 110N offer separate underlay connections (not shown in FIG. 1) between SD-WAN edge 108A and SD-WAN edge 108C. The underlay connection may be public or private and may be a network service offering, such as a label switched path (LSP), an Ethernet service, and IP service, a public Internet service, broadband service, fifth generation (5G) service, long term evolution (LTE) service, or other service that enables an overlay WAN link. Costs for usage of an underlay connection may be flat-rate or usage-based. Each underlay connection may have a bandwidth limitation, performance metrics (e.g., latency, loss, jitter, and so forth). SD-WAN service 101 may be deployed using underlay connections based on multiple different types of network service. In the example of FIG. 1, for instance, an underlay connection from SD-WAN 108A to SD-WAN edge 108C via transport network 110A may be an LSP for an IP-VPN, while an underlay connection from SD-WAN 108A to SD-WAN edge 108C via transport network 110N may be an Internet Protocol Security (IPSec) tunnel over the Internet. This diversity may be advantageous for an SD-WAN service by facilitating redundancy and by offering differentiated service capabilities to enable matches between cost/performance and application requirements/SLA for different traffic that uses the SD-WAN service. For example, SD-WAN edge 108A may direct low-cost traffic via the Internet while directing traffic for an application that requires low-latency (e.g., Voice-over-IP) via an LSP. An underlay connection may be created and/or managed by the SD-WAN service provider or by the SD-WAN service 101 subscriber that notifies service orchestrator 102 of the underlay connection.

Service orchestrator 102 obtains the link data for WAN links 142, including bandwidth limitations for WAN links 142 (if any). Service orchestrator 102 may obtain the link data from SD-WAN controller 104, receive configuration data that has the link data, or obtain the link data from another network controller or from SD-WAN edges 108. WAN links 142 are described and illustrated as bidirectional, but each of WAN links 142 may represent two separate WAN links, one for each direction.

SD-WAN system 100 illustrates multiple sites associated with a subscriber of the SD-WAN service 101 provider and attached to subscriber-facing interfaces of SD-WAN edges 108. These sites may be referred to as subscriber sites, which make up the subscriber network in that SD-WAN service 101 interconnects the multiple sites operated by a subscriber to form a single network. Network system 100 in the example of FIG. 1 includes sites 106A-106B and may optionally include any of site 106C, hub 112 (sometime referred to as a "provider hub"), cloud 114, or cloud service 116. In some cases, the "subscriber" and the SD-WAN provider are the same entity, as where an enterprise deploys and manages SD-WAN system 100.

Each of sites 106A-106C refers to a subscriber location and may represent, for example, a branch office, private cloud, an on-premises spoke, an enterprise hub, or a cloud spoke. Sites 106A-106C may consume or provide services 111A-111C respectively. Services 111A-11C can include file services, email services, communication services, etc. A service, as used herein, can include standalone applications, sessions of applications, user space processes, kernel processes, processing threads etc. Each of the services 111 at a site 106 may have different network service level requirements. Further, a service may have multiple sessions. For example, a teleconferencing service may have multiple sessions, each with different network service level requirements. As an example, a video session of the teleconferencing service may have high bandwidth and low jitter and latency requirements, while an audio session may have lower bandwidth requirements, but may also have low jitter and latency requirements. A chat session may have low bandwidth requirements and may not be sensitive to jitter and/or latency. The term "application" and "service" may be used interchangeably. The techniques described herein for generating adaptive location based policies can be applied to services, applications, processes, threads, or other identifiable units of execution.

Hub 112 represents a multitenant hub device located in a point-of-presence (PoP) on the service provider network. Hub 112 may terminate overlay tunnels for overlay networks, which may be of various types such as MPLS over Generic Route Encapsulation (MPLSoGRE) and MPLSoGRE over IPSec (MPLSoGREoIPsec) and MPLS over User Datagram Protocol (MPLSoUDP) tunnels. Hub 112 may be the hub in a hub-and-spoke architecture for some example deployments of SD-WAN service 101.

Cloud 114 represents a public, private, or hybrid cloud infrastructure. Cloud 114 may be a virtual private cloud within a public cloud. Cloud service 116 is a resource or higher order service that is offered by a cloud service provider to the subscriber over SD-WAN service 101. Cloud service 116 may be, for instance, Software as a Service (SaaS), Platform as a Service (PaaS), Infrastructure as a Service (IaaS), Storage as a Service, or other type of cloud service. Cloud service 116 may be offered by infrastructure of cloud 114.

Internet 118 represents the web and/or an Internet-connected service offered via the web. SD-WAN edge 108B, in this example, includes an Internet breakout 120 and may assign application flows to Internet breakout 120 according to a policy.

Each of SD-WAN edges 108 includes a physical network function or virtual network function for implementing SD-WAN service 101. In various examples, each of SD-WAN edges 108 may be, for instance, one or more VNFs or a PNF located within any of a service provider data center, provider hub, customer premises, or cloud provider premises. Each of SD-WAN edges 108 may be a router, security device such as a firewall, a gateway, a WAN acceleration device, a switch, a cloud router, a virtual gateway, a cloud virtual gateway, an SD-WAN device, or other device that implements aspects of SD-WAN service 101.

In various examples, each of SD-WAN edges 108 may be an on-premises spoke that is a PNF placed at a subscriber branch site in either a hub-and-spoke or full mesh topology; a cloud spoke that is a VNF located in a subscriber's virtual private cloud (VPC) (or equivalent term) within a public cloud; a PNF or VNF located in a service provider cloud operating as a hub device to establish tunnels with the spoke sites (hub devices may be multitenant, i.e., shared amongst multiple sites through the use of virtual routing and forwarding instances configured thereon): a PNF or VNF located at an enterprise and operating as an enterprise hub to provide additional hub-like capabilities to a normal spoke site (e.g., act as anchor point for spokes for dynamic virtual private network (VPN) creation, provide an on-premises central breakout option, host a data center department, import routing protocol routes to create a dynamic LAN segment, and meshing with other enterprise hubs that belong to the same tenant/subscriber). Each of SD-WAN edges 108 may be located at the location of any of sites 106, hub 112, cloud 114, or cloud service 116.

SD-WAN edges 108 are logically located at the boundary between the provider SD-WAN service 101 and the subscriber network. SD-WAN edges 108 have network-side interfaces for the underlay connection and subscriber-side interfaces for communication with the subscriber network. As noted above, SD-WAN edges 108 may have multiple paths to each other (diverse underlay connections). For example, in a hub-and-spoke deployment, SD-WAN edge 108A has multiple paths, each via a different one of transport networks 110, to SD-WAN edge 108C of hub 112. Interfaces of SD-WAN edges 108 may primarily be used for underlay connections for user data traffic, but interfaces may also be used for management traffic to, e.g., send WAN link characterization data 130 to service orchestrator 102 and, in some aspects, network analysis system 124, and to receive policies, device configurations, and other configuration data from service orchestrator 102 and/or network analysis system 124.

Service orchestrator 102 may provision and establish overlay tunnels between SD-WAN edges 108 to realize a SD-WAN service 101 topology. In the example of FIG. 1, any of WAN links 142 may be implemented in part using a point-to-point overlay tunnel, e.g., for a virtual private network. Overlay tunnels inherit the performance characteristics of the underlying underlay connection. Overlay tunnels may be encrypted or unencrypted. SD-WAN edges 108 may use any of a variety of encapsulation types, such as MPLS, MPLSoGRE, IP-in-IP, MPLSoUDP, MPLSoGREoIPSec, IPSec, GRE, to implement overlay tunnels.

SD-WAN edges 108 use WAN links 142 to send application traffic across the SD-WAN service 101 to other SD-WAN edges 108. WAN links 142 typically but do not necessarily traverse different underlay connections between SD-WAN edges 108. N WAN links 142A-A-142A-N connect SD-WAN edge 108A and SD-WAN edge 108C. In the example of FIG. 1, each of WAN links 142A-A-142A-N traverses a different one of transport networks 110. Similarly, N WAN links 142N-A-142N-N connect SD-WAN edge 108B and SD-WAN edge 108C, each via a different one of transport networks 110. In a full mesh topology (not shown), additional WAN links would connect SD-WAN edges 108A, 108B. WAN links 142 may also be referred to as "overlay connections," "virtual connections," "tunnel virtual connections," "SD-WAN links," or other terminology that describes WAN links for realizing an SD-WAN service.

Service orchestrator 102 may use SD-WAN controller 104 to deploy SD-WAN service 101 in various architectural topologies, including mesh and hub-and-spoke. A mesh topology is one in which traffic can flow directly from any site 106 to another other site 106. In a dynamic mesh, SD-WAN edges 108 conserve resources for implementing full-mesh topologies. All of the sites in the full mesh are included in the topology, but the site-to-site VPNs are not brought up until traffic crosses a user-defined threshold called the Dynamic VPN threshold. Sites in the mesh topology may include sites 106, cloud 114, and/or cloud service 116. In a hub-and-spoke topology, all traffic passes through hub 112, more specifically, through SD-WAN edge 108C deployed at hub 112. By default, traffic to the Internet also flows through provider hub 112. In a hub-and-spoke topology, network services (e.g., firewall or other security services) may be applied at the central hub 112 location, which allows all network traffic for SD-WAN service 101 to be processed using the network services at a single site. SD-WAN service 101 may have a regional hub topology that combines full mesh and hub-and-spoke using one or more regional hubs that connect multiple spokes to a broader mesh.

SD-WAN edges 108 receive ingress network traffic from corresponding subscriber sites and apply SD-WAN service 101 to forward the network traffic via one of the WAN links 142 to another one of SD-WAN edges 108. SD-WAN edges 108 receive network traffic on WAN links 142 and apply SD-WAN service 101 to, e.g., forward the network via one of the WAN links 142 to another one of SD-WAN edges 108 (where the SD-WAN edge is a hub) or to the destination subscriber site.

To apply SD-WAN service 101, SD-WAN edges 108 process network traffic according to routing information, policy information, performance data, and service characteristics of WAN links 142 that may derive at least in part from performance, bandwidth constraints, and behaviors of the underlay connections. SD-WAN edges 108 can use dynamic path selection to steer network traffic to different WAN links 142 to attempt to meet QoS/QoE requirements defined in SLAs and configured in SD-WAN edges 108 for SD-WAN service 101, or to route around failed WAN links, for example. For example, SD-WAN edge 108A may select WAN link 142A-A that is a low-latency MPLS path (in this example) for VoIP traffic, while selecting WAN link 142A-N that is a low-cost, broadband Internet connection for file transfer/storage traffic. SD-WAN edges 108 may also apply traffic shaping. The terms "link selection" and "path selection" refer to the same operation of selecting a WAN link for an application and are used interchangeably.

In accordance with techniques of this disclosure, policy information used by SD-WAN edges 108 to process network traffic can be provided by local policies 107A-107C at sites 106A-106C respectively. The local policies 107A-107C may be different from site to site. In some aspects, a subscriber can create global policy 109 that may be intended to apply to all of sites 106 operated by the subscriber. Network analysis system 124 can modify global policy 109 to create local policies 107A-107C that may be customized or tailored for sites 106A-106C respectively. In some aspects, network analysis system 124 can utilize techniques disclosed herein to customize global policy 109 based on WAN link characterization data associated with WAN links that terminate at one or more sites. For example, network analysis system 124 can utilize WAN link characterization data 130 of WAN links 142A-A through 142A-N (or a subset thereof) to customize local policy 107A of site 106A. Similarly, network analysis system 124 can utilize WAN link characterization data 130 of WAN links 142N-A to 142N-N (or a subset thereof) to customize local policy 107B for site 106B. In some aspects, network analysis system 124 provides current WAN link characterization data 130 as input for a machine learning model trained on historical WAN link characterization data.

Output of the machine learning model can be used to create a customized local policy 107 for any of sites 106. Once created, some or all of local polices 107 can be periodically adjusted (i.e., modified) by applying the machine learning model to current WAN link characterization data 130.

SD-WAN edges 108 can process and forward received network traffic for SD-WAN service 101 according to local policies 107 and configuration data from service orchestrator 102 and/or network analysis system 124, routing information, and current network conditions including underlay connection performance characteristics. In some examples, service orchestrator 102 may push SLA parameters, path selection parameters and related configuration to SD-WAN edges 108. In some aspects, service orchestrator 102 may utilize local policies 115 to determine the SLA parameters, path selection parameters and configuration data to push to SD-WAN edges 108. As with local policies 107, local policies 115 may, for example, initially be a customized version of a global policy, and may be periodically adjusted based on current WAN link characterization data 130.

SD-WAN edges 108 monitor the links for SLA violations and can switch an application to a different one of WAN links 142 based on local policies 107. SD-WAN edges 108 may thereby implement the data plane functionality of SD-WAN service 101 over the underlay connections including, in such examples, application switching to different WAN links 142 for application QoE.

In some aspects, an SD-WAN edge 108 and routers of a transport network 110 (not shown in FIG. 1) can provide WAN link characterization data 130 to service orchestrator 102 and/or network analysis system 124. As an example, SD-WAN edge 108 and the routers may provide WAN link characterization data every thirty seconds. WAN link characterization data 130 can include information regarding performance metrics, link types, link costs, location data, SLA violations, SLA metrics, etc. For example, if there is an SLA violation detected by one of SD-WAN edges 108, the SD-WAN edge may report and send log messages to service orchestrator 102 describing the SLA violation and the selected WAN link. SD-WAN edges 108 may also aggregate, optionally average, and report SLA metrics for WAN links 142 in log messages to service orchestrator 102 and/or network administrator 124.

WAN link characterization data analysis, SLA evaluation, path selection, and link switching functionality are all performed by SD-WAN system 100, but different examples of SD-WAN system 100 may have a different distribution of control plane functionality between service orchestrator 102, SD-WAN edges 108, and network analysis system 124 than those examples just described. Techniques described herein with respect to QoE are similarly applicable to QoS, etc.

SD-WAN edges 108 may forward traffic based on application flows. Packets of application flows can be identified using packet characteristics, such as layer 3 and layer 4 (e.g., TCP, UDP) header fields (e.g., source/destination layer 3 addresses, source/destination ports, protocol), by deep packet inspection (DPI), or other flow identification techniques for mapping a packet to an application or, more specifically, an application flow. An application flow may include packets for multiple different applications or application sessions, and a single application may be split among multiple application flows (e.g., separate video and audio streams for a video conferencing application).

SLAs may specify applicable application flows and may include policies for application flow forwarding. SD-WAN edges 108 may identify application flows and apply the appropriate policies to determine how to forward the application flows. In some aspects, the policies may be local policies 107 that have been customized for an SD-WAN edge based on a global policy 109. For example, SD-WAN edges 108 may use application-specific QoE and advanced policy-based routing (APBR) to identify an application flow and specify a path for the application flow by associating local SLA profiles to a routing instance on which the application flow is to be sent. The routing instance may be a virtual routing and forwarding instance (VRF), which is configured with interfaces for the WAN links 142.

QoE aims to improve the user experience at the application level by monitoring the class-of-service parameters and SLA compliance of application traffic and facilitating placement of application data on SLA-compliant WAN links 142 (or the most SLA-compliant WAN link available). Service orchestrator 102 can monitor the application traffic for an application for SLA compliance. In some examples, SD-WAN edges 108 (independently or by direction from service orchestrator 102) may move the application traffic from WAN 142 links that fail to meet the SLA requirements to one of WAN links 142 that meets the SLA requirements. SD-WAN edges 108 may determine that a WAN 142 link fails to meet SLA requirements based on local policies 107. Further, SD-WAN edges may select a WAN link 142 that meets SLA requirements based on local policies 107.

Configuring service orchestrator 102 to cause SD-WAN system 100 to apply QoE for SD-WAN service 101 may involve configuring multiple profiles of various profile types that enable the user to parameterize QoE for various applications application groups having traffic transported by SD-WAN service 101. A profile typically includes human-readable text that defines one or more parameters for a function or associates the profile with other profiles to parameterize higher-level functions. In various examples, service orchestrator 102 may offer a variety of configuration schemes for parameterizing QoE for SD-WAN service 101.

A subscriber can interact with service orchestrator 102 to create an SLA profile for an application, referred to herein as an "application SLA profile" or simply an "SLA profile." An SLA profile may include SLA configuration data, such as a traffic type profile, an indication of whether local breakout is enabled, a path preference (e.g., an indication of a preferred WAN link of WAN links 142 or type of WAN link (e.g., MPLS, Internet, etc.)), an indication of whether failover is permitted when an active WAN link has an SLA violation of the SLA profile, the criteria for failover (e.g., violation of any SLA parameters or violation of all SLA parameters required to trigger failover).

SLA parameters may be included in an SLA metric profile that is associated with or otherwise part of an SLA profile. SLA parameters may include parameters such as throughput, latency, jitter, jitter type, packet loss, round trip delay, time to first packet, average session length, packet retransmission rate, or other performance metrics for traffic (which correlate and correspond to performance metrics for a WAN link that carries such traffic). Throughput may refer to the amount of data sent upstream or received downstream by a site during a time period. Latency is an amount of time taken by a packet to travel from one designated point to another. Packet loss may be specified as a percentage of packets dropped by the network to manage congestion. Jitter is a difference between the maximum and minimum round-trip times of a packet. Time to first packet may be specified as the time interval between when a transport layer session for an application or service begins and when a first packet transmitted by the application or service reaches its destination. Average session length is the average time period that a session or application is active. Packet retransmission rate may be specified as a measurement of the number of times a packet had to be retransmitted to its destination.

An SLA profile may further specify SLA sampling parameters and rate limiting parameters. Sampling parameters may include session sampling percentage, SLA violation count, and sampling period. Session sampling percentage may be used to specify the matching percentage of sessions for which service orchestrator should collect WAN link characterization data 130. SLA violation count may be used to specify the number of SLA violations after which SD-WAN system 100 should determine whether or not to switch to a different one of WAN links 142. Sampling period may be used to specify the sampling period for which the SLA violations are counted.

Rate limiting parameters may include maximum upstream rate, maximum upstream burst size, maximum downstream rate, maximum downstream burst size, and loss priority. Maximum upstream rate may be used to specify the maximum upstream rate for all applications associated with the SLA profile. Maximum upstream burst size may be used to specify the maximum upstream burst size for all applications associated with the SLA profile. Maximum downstream rate may be used to specify the maximum downstream rate for all applications associated with the SLA profile. Maximum downstream burst size may be used to specify the maximum downstream burst size for all applications associated with the SLA profile. Loss priority may be used to select a loss priority based on which packets can be dropped or retained when network congestion occurs. The probability of a packet being dropped by the network is higher or lower based on the loss priority value.

An application SLA profile may be specified using an SLA rule that includes all required information to measure SLA and to identify whether any SLA violation has occurred or not. An SLA rule may contain the time period in which the profile is to be applied, preferred SLA configuration, and other SLA parameters described above (e.g., SLA sample parameters, rate limiting parameters, metrics profile). An SLA rule is associated with an application or application group and to become its SLA profile. In other words, an SLA profile for an application may be a particular SLA rule (e.g., "SLA3") as configured in service orchestrator 102. In some cases, the SLA rule may be associated in this way by association with an APBR rule that is matched to an identified application or application group. As noted above, in some examples, service orchestrator 102 may push SLA parameters, path selection parameters, routing information, routing and interface data, and related configuration to SD-WAN edges 108, and SD-WAN edges 108 monitors the links for SLA violations and can switch an application to a different one of WAN links 142.

SLA violations occur when the performance of a WAN link is below acceptable levels as specified by the SLA. To attempt to meet an SLA, SD-WAN system 100 may monitor the network for sources of failures or congestion. If SD-WAN system 100 determines an SLA violation has occurred for a WAN link, SD-WAN system 100 may determine an alternate path to select the best WAN link 142 that satisfies the SLA. The best WAN link 142 may be determined according to a local policy 107 for a site.

An overlay path includes the WAN links 142 that are used to send the application traffic for an application. SD-WAN system 100 may assign applications to a particular WAN link 142 based on the SLA metrics of the WAN link 142 and local policy 107.

In general, service orchestrator 102 configures SD-WAN edges 108 to recognize application traffic for an application, and service orchestrator 102 specifies paths for certain traffic by associating SLA profiles to routing instances by which SD-WAN edges 108 send application traffic to satisfy rules of an APBR profile.

APBR enables application-based routing by service orchestrator 102 that is managing SD-WAN edges 108. An APBR profile specifies matching types of traffic, e.g., by listing one or more applications or application groups. The APBR profile may include multiple APBR rules that each specifies one or more applications or application groups. If network traffic matches a specified application, the rule is considered a match. An SLA rule may be associated with a APBR rule to specify how matching traffic should be handled for QoE. An APBR rule may also specify a routing instance to be used by SD-WAN edges 108 to route traffic matching the APBR rule. The routing instance may have interfaces for one or more WAN links 142. Service orchestrator 102 configures SD-WAN edges 108 with an APBR profile (or configuration data derived therefrom) to cause SD-WAN edges 108 to use APBR in accordance with the APBR profile to implement SD-WAN service 101.

In some examples, SD-WAN edges 108 (e.g., SD-WAN edge 108A) process packets received on an interface to identify the application for the packets. SD-WAN edge 108A may apply an APBR profile to attempt to match the application to an APBR rule therein. If a matching APBR rule is not found, SD-WAN edge 108A forwards the packets normally. If a matching APBR rule is found, however, SD-WAN edge 108A uses the routing instance specified in the APBR rule to route the packets.

A routing instance has associated interfaces for one or more links used by the routing instance to send and receive data. The routing instance, configured in SD-WAN edges 108 and which may be associated with an APBR rule of a local APBR profile, has interfaces for WAN links 142 to send and receive application traffic. These interfaces may be interfaces for underlay connections.

SD-WAN edges 108 may route traffic using different links based on the link preference determined using SLA rules. Further details on selection of WAN links according to SLA and SLA rules can be found in U.S. patent application Ser. No. 17/139,695, entitled "WAN LINK SELECTION FOR SD-WAN SERVICES" and filed on Dec. 31, 2020, the entire contents of which is hereby incorporated by reference herein.

Figure 2:
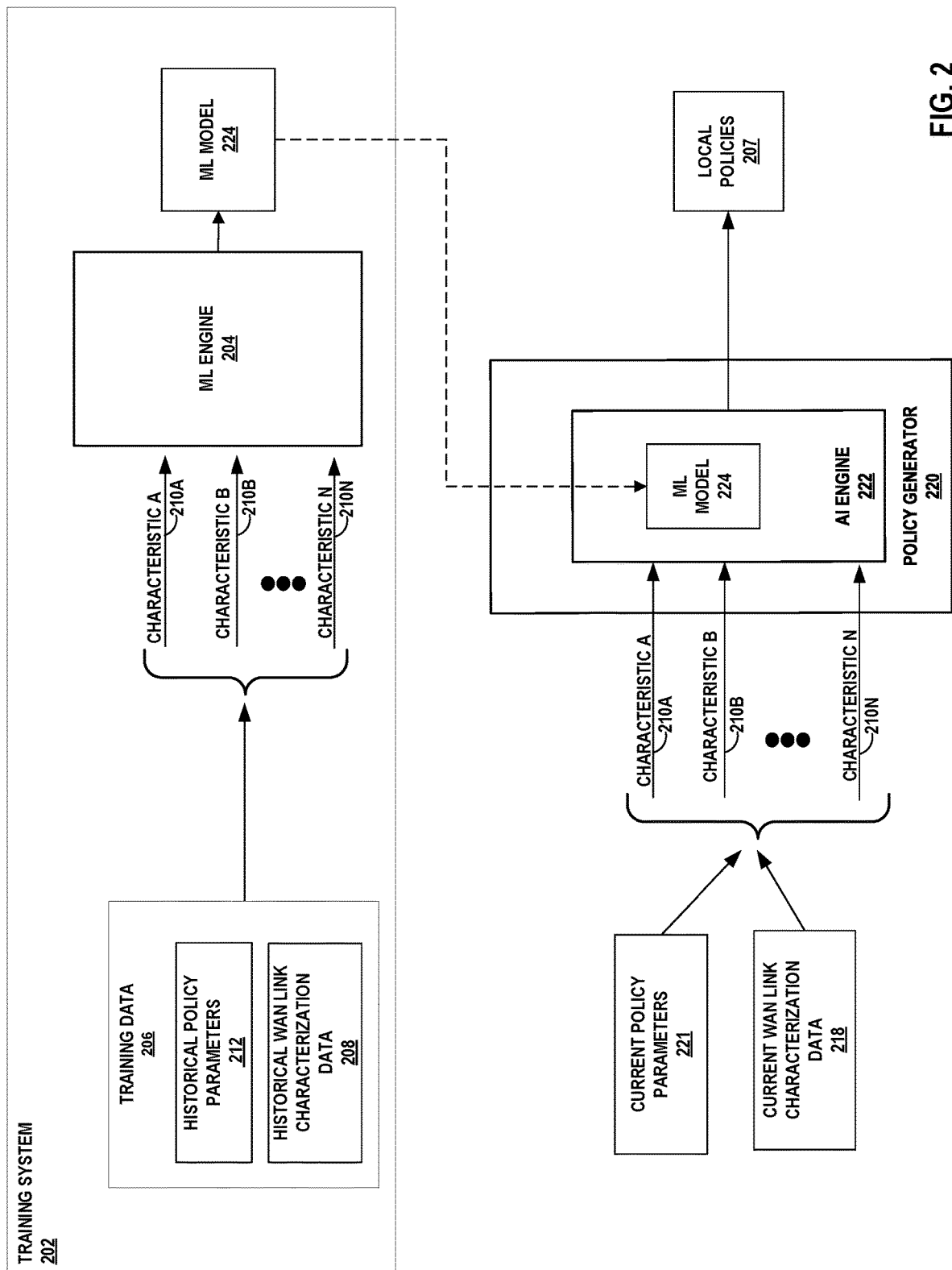
FIG. 2 is a conceptual view illustrating training and using a machine learning model that generates a site-specific local policy.

FIG. 2 is a conceptual view illustrating training and using a machine learning model that generates a site-specific local policy. FIG. 2 illustrates a training system 202 that is configured to train machine learning model 224 to generate a local policy. Training system 202 can include machine learning engine 204 comprising processing circuitry and memory, and that can be configured to use supervised or unsupervised machine learning techniques and other heuristics to train machine learning model 224 to generate the local policy based on training data 206. In some examples, machine learning engine may generate a machine learning model 424 that may represent a neural network. In some examples, machine learning engine 204 may generate Bayesian statistics that are incorporated into machine learning model 224. Training data 206 can be historical WAN link characterization data 208 collected over a predetermined or configurable time period prior to its use as training data 206. In some aspects, the time period may be a two week time period, although the time period may be greater than or less than two weeks. Historical WAN link characterization data 208 can include performance metrics such as throughput, latency, jitter, jitter type, packet loss, round trip delay, time to first packet, average session length, packet retransmission rate, or other performance metrics, historical link data that describes a WAN link, such as link type, MTU, bandwidth limits, and link cost. Historical WAN link characterization data 208 may include identifiers for applications associated with WAN link traffic. Historical WAN link characterization data 208 can include the policy parameters (rules, thresholds, parameter values, etc.) of policies that were in effect at the time performance metrics were measured. The policy parameters can be associated with the corresponding performance metrics that were in effect when the performance metric measurement was performed. Historical WAN link characterization data 208 can include location data indicating the source of the performance data and policy data. The location data may be a site identifier of the site where the data was collected, a geographic location, or a network topology location.

Historical WAN link characterization data 208 for the WAN link may include independent and dependent variables. Independent variables may include time, dates, application traffic load, network paths, time of day, events, conditions, application identifiers for applications or application types/groups served by the WAN link, any of the characteristics 210 of a WAN link described below, or any other variables or conditions that may affect any performance metric of the WAN link. The primary dependent variables are the performance metrics of the WAN link. Training data 206 may include training data for multiple WAN links at multiple customer sites. WAN links characterized by training data 206 may be different WAN links, including WAN links for different SD-WAN systems other than those for which a local policy is to be generated. However, because different WAN links may provide similar performance under similar conditions, the techniques permit application of "global" knowledge to local conditions to improve performance of local policy generation. The application of such global knowledge can accelerate setting up of policy for a new site using a smaller volume of training data. Additionally, in some aspects, transfer learning can be leveraged to set policy parameters for a new site depending on the similarity of the new site with other existing customer sites.

The training data 206 can include characteristics 210A-210N that can be selected from historical WAN link characterization data 208, and historical policy parameters 212. Historical policy parameters 212 can be used to learn customer business intent and cost preferences. In some aspects, characteristics 210A-210N can include some or all of link types, link costs, MTUs, timestamps, dates, locations (e.g., geographic locations or site identifiers), performance characteristics, service characteristics, policy parameters, and environment characteristics for a WAN link. Performance characteristics can include throughput, latency, jitter, jitter type, packet loss, round trip delay, time to first packet, average session length, packet retransmission rate, or other performance metrics for traffic (which correlate and correspond to performance metrics for a WAN link that carries such traffic). Throughput may refer to the amount of data sent upstream or received downstream by a site during a time period. Latency is an amount of time taken by a packet to travel from one designated point to another. Packet loss may be specified as a percentage of packets dropped by the network to manage congestion. Jitter is a difference between the maximum and minimum round-trip times of a packet. Average session length is the average time period that a session or application is active. Packet retransmission rate may be specified as a measurement of the number of times a packet had to be retransmitted to its destination etc. Service characteristics can include link bandwidth, maximum transmission unit (MTU), etc. Environment characteristics can include device type, timestamp, network interface type etc. Characteristics 210A-210N may be selected manually, for example, by a subject matter expert or automatically, for example, by a feature extractor (not shown in FIG. 2).

In some aspects, as part of processing training data 206, machine learning engine 204 may learn "signatures" for various paths through an SD-WAN. These signatures can be derived from characteristics 210 and can identify characteristics of various paths (e.g., typical available throughput, jitter, latency etc.). The path signatures can be included in machine learning model 224. Additionally, services can have associated service network characteristics identifying network requirements of the service with respect to performance. Theses service network characteristics can be used to match services with paths through a network.

Machine learning engine 204 can perform spatial and temporal learning on training data 206. In some aspects, machine learning engine 204 can correlate location with performance metrics in the training data. For example, machine learning engine may correlate performance metrics with a particular site, the location of a group of sites, a location in a network topology, or a network service provider in a geographic location. In some aspects, machine learning engine 204 can correlate temporal parameters with performance metrics for a WAN link. For example, machine learning engine may correlate performance metrics with a time of day, day of week, month of year etc. The correlations of location and time can be incorporated into rules and/or parameters of local policies 207. Local policies 207 may represent examples of local policies 107.

Machine learning engine 204 may train machine learning model 224 using an objective function. In some aspects, the objective function is to optimize user experience (e.g., QoE) with respect to a cost factor of a network.

In the example training system 202 discussed above, machine learning engine 204 generates a machine learning model 224 that can be used to generate parameters for a local policy. In some aspects, machine learning engine 204 can generate a machine learning model 224 that, when processed by AI engine 222, produces output parameters and thresholds for use by policy generator in creating local policies 207. In some aspects, machine learning engine 204 may generate a machine learning model 204, that when processed by AI engine 222, produces an output is an index or indicator that can be used to select a predetermined local policy from a set of candidate local policies, where each candidate local policy in the set has different parameter or parameter values. The output of the machine learning model can provide an index or indicator of the candidate local policy in the set that is a "best match" to the WAN link characterization data.

After training, machine learning model 224 may be deployed for use by AI engine 222 of policy generator 220. During operation, AI engine 222 can receive current WAN link characterization data 218 from SD-WAN edges 108 and the routers of transportation networks 110, and process the current WAN link characterization data 218 and current policy parameters 221 using machine learning model 224 to generate local policies 207 for SD-WAN edges 108. Current policy parameters 221 can be parameters from a global policy (e.g., global policy 109, FIG. 1) and/or current parameters of one or more local policies. As noted above, historical policy parameters 212 can be used to derive customer business intent and cost preferences. In some aspects, AI engine 222 can use machine learning model 224 to fine-tune current policy parameters 221 around these historical preset values. In some aspects, AI engine 222 can receive the same characteristics 210A-210N that were used to train machine learning model 224. The AI engine 222 can generate a local policy for a site (e.g., one of local policies 207) that may include parameters from current policy parameters 221 that have been adjusted based on the current WAN link characterization data for a site. In some aspects, the local policy for each site can be a version of a global policy that has been tailored (i.e., customized) for the respective site. In some aspects, policy generator 220 (or AI engine 222) may receive location data for the site for which a local policy is to be generated. Policy generator 220 can use the location data to determine if a local policy has been generated for a nearby site. In some aspects, policy generator 220 can generate a local policy a site A to be similar to that of a site B if sites A and B are close to each other. This can be desirable as two sites that are close to each other will typically tend to experience the same local network conditions.

AI engine 222 may generate new local policies 207 periodically or on demand. The new local policies may be generated based on update WAN link characterization data 218. In some aspects, a new local policy may be generated and deployed once per day, although periods may be longer or shorter than one day. Updating a local policy on a periodic basis can have a technical advantage over existing systems in that the local policy generated by the SD-WAN system is able to meet changing needs and conditions on an SD-WAN and, more specifically, the underlying transport networks.

In some aspects, policy generator 220 (or AI engine 222) can provide feedback to training system 202 regarding the performance of a local policy. This feedback can be incorporated into training data 206 for use in training (or retraining) machine learning model 204.

Thus, a system may train a machine learning model based on the past performance of various policy parameters used at various sites. An AI engine such as AI engine 222 can use the model to automatically, and on a site-by-site basis, select and/or adjust a local policy so as to optimize path selection and traffic steering, performance, adherence to an SLA, etc., for a particular site or sites.

Figure 3:
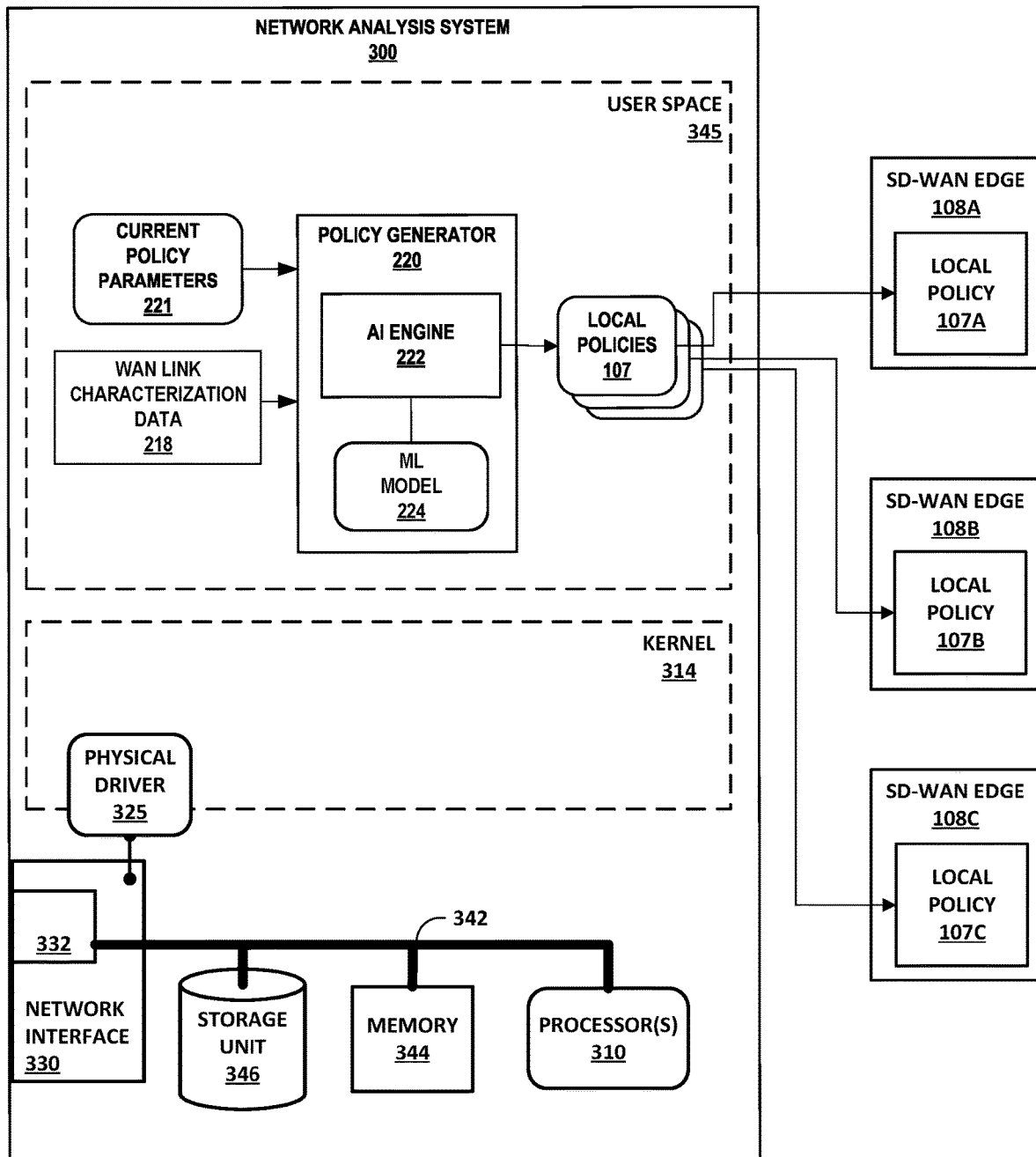
FIG. 3 is a block diagram illustrating a network analysis system (NAS), according to techniques described in this disclosure.

FIG. 3 is a block diagram illustrating a network analysis system (NAS), according to techniques described in this disclosure. NAS 300 may be an example implementation of, for example, NAS 124 of FIG. 1. NAS 300 includes in this example, a bus 342 coupling hardware components of a hardware environment. Bus 342 couples NIC 330, storage unit 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Processor(s) 310 may include one or more processors each including an independent execution unit comprising processing circuitry to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor). Processor(s) 310 execute software instructions, such as those used to define a software or computer program, stored to a storage medium (such as memory 344 or storage unit 346). The software instructions can cause processors 310 to perform the techniques described herein.

Storage unit 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 310.

Memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 344 provides a physical address space composed of addressable memory locations.

Network interface card (NIC) 330 includes one or more interfaces 332 configured to exchange packets using links of an underlying physical network. NIC 330 can couple NAS 300 to a network and/or the Internet, such as any of network(s) 110 as shown in FIG. 1, and/or any local area networks. Interfaces 332 may include a port interface card having one or more network ports. Interfaces 332 may include, for example, an Ethernet interface. NIC 330 may also include an on-card memory to, e.g., store packet data. Direct memory access transfers between the NIC 330 and other devices coupled to bus 342 may read/write from/to the NIC memory. NIC 330 receives/transmits data and information to/from any of SD-WAN edges 108, SD-WAN controller 104, and/or any other devices or systems forming part of network system 100 such as shown in FIG. 1. The data and information received by NAS 300 may include, for example, WAN link characterization data 130 (FIG. 1) and/or current WAN link characterization data 218 (FIG. 2) describing the performance and capabilities of WAN links 142 (FIG. 1).

Memory 344, NIC 330, storage unit 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. The operating system may execute a hypervisor and one or more virtual machines managed by hypervisor. An operating system that includes kernel 314 provides an execution environment for one or more processes in user space 345. Kernel 314 includes a physical driver 325 that provides a software interface facilitating the use NIC 330 by kernel 314 and processes in user space 345.

The hardware environment and kernel 314 provide a user space 345 operating environment for applications such as policy generator 220. Policy generator 220 can receive WAN link characterization data 218 from various components of a network system such as network system 100 shown in FIG. 1. For example, policy generator 220 can receive WAN link characterization data 218 from SD-WAN edges, routers, and other network devices. Policy generator 220 can apply machine learning model 224 to WAN link characterization data 218 and current policy parameters 221 to generate local policies 107 for one or more sites 108A-108C. Local policies 107 may include policies 107A-107C among others. After generating local policies 107, policy generator 220 can distribute the local policies to the appropriate SD-WAN edges 108A-108C based on the site for which the local policy 107 was generated.

Figure 4:
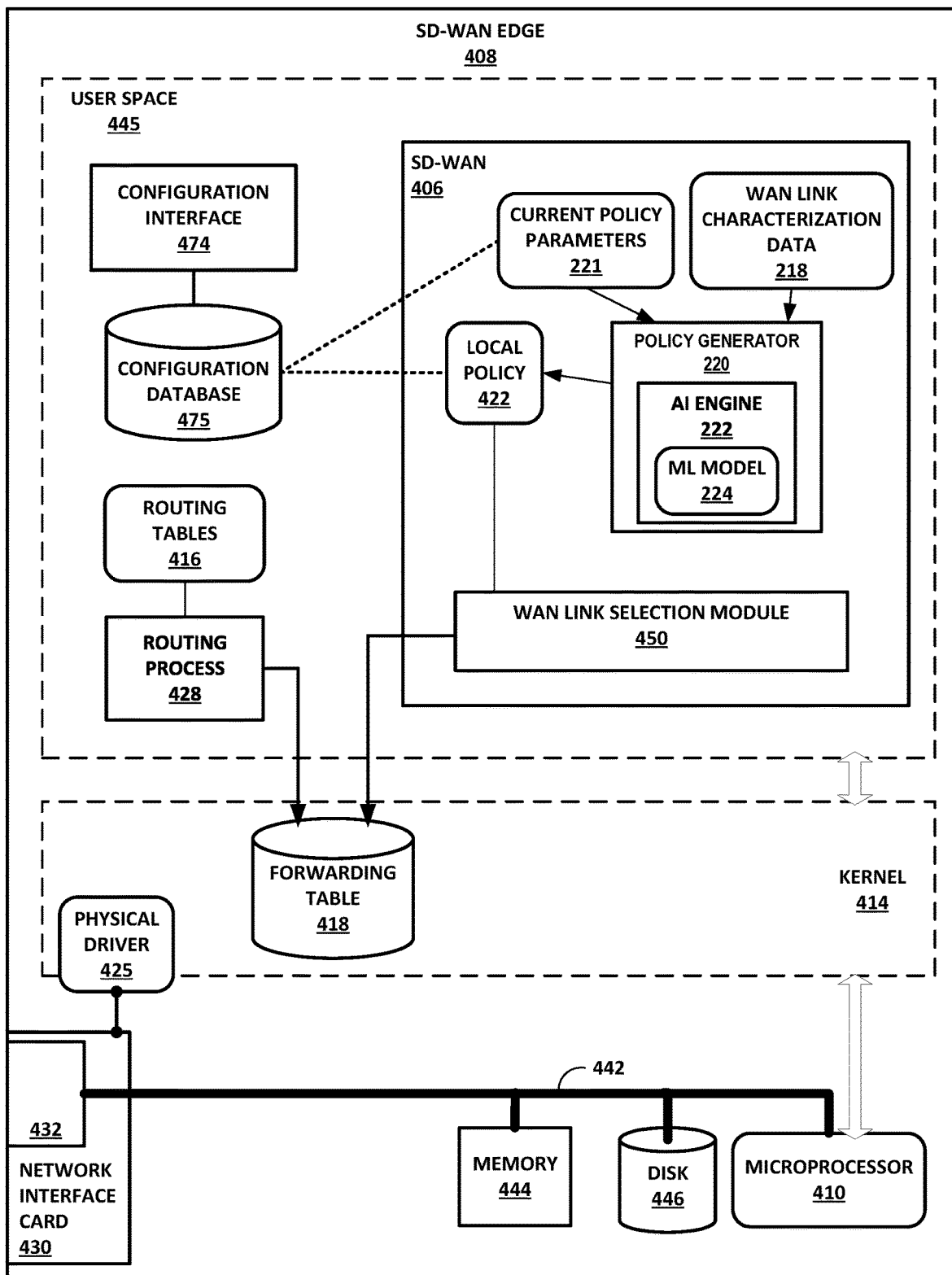
FIG. 4 is a block diagram illustrating an example SD-WAN edge device in further detail, according to techniques described in this disclosure.

FIG. 4 is a block diagram illustrating an example SD-WAN edge device in further detail, according to techniques described in this disclosure. SD-WAN edge device 408 ("SD-WAN edge 408") may represent any of SD-WAN edges 108 of FIGS. 1 and 3. SD-WAN edge 408 is a computing device and may represent a PNF or VNF. SD-WAN edge 408 may include one or more real or virtual servers configured to execute one or more VNFs to perform operations of an SD-WAN edge. VNFs may include virtual machines or containers, for example.

SD-WAN edge 408 includes in this example, a bus 442 coupling hardware components of a hardware environment. Bus 442 couples network interface card (NIC) 430, storage unit 446, and one or more microprocessors 410 (hereinafter, "microprocessor 410"). A front-side bus may in some cases couple microprocessor 410 and memory device 444. In some examples, bus 442 may couple memory device 444, microprocessor 410, and NIC 430. Bus 442 may represent a Peripheral Component Interface (PCI) express (PCIe) bus. In some examples, a direct memory access (DMA) controller may control DMA transfers among components coupled to bus 442. In some examples, components coupled to bus 442 control DMA transfers among components coupled to bus 442.

Processor(s) 410 may include one or more processors each including an independent execution unit comprising processing circuitry to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Storage unit 446 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor(s) 410.

Memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 444 provides a physical address space composed of addressable memory locations.

Network interface card (NIC) 430 includes one or more interfaces 432 configured to exchange packets using links of an underlying physical network. Interfaces 432 may include a port interface card having one or more network ports. NIC 430 may also include an on-card memory to, e.g., store packet data. Direct memory access transfers between the NIC 430 and other devices coupled to bus 442 may read/write from/to the NIC memory. Interfaces 432 may be interfaces for underlay connections of WAN links configured for SD-WAN application 406 between SD-WAN edge 408 and one or more other SD-WAN edges.

Memory 444, NIC 430, storage unit 446, and processor(s) 410 may provide an operating environment for a software stack that includes an operating system kernel 414 executing in kernel space. As with kernel 314 described above, kernel 414 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 414 provides an execution environment for one or more processes in user space 445. Kernel 414 includes a physical driver 425 that provides a software interface facilitating the use NIC 430 by kernel 414 and processes in user space 445.

The hardware environment and kernel 414 provide a user space 445 operating environment for SD-WAN edge 408 applications, including routing process 428, configuration interface 474, and SD-WAN application 406. Configuration interface 474 enables SD-WAN controller 104 (FIG. 1) or an operator to configure SD-WAN edge 408. Configuration interface 474 may provide a NETCONF interface, Simple Network Management Protocol (SNMP), a command-line interface, a RESTful interface, Remote Procedure Calls, or other interface by which remote devices may configure SD-WAN edge 408 with configuration information stored to configuration database 475. Configuration information may include, e.g., local policy 422. Local policy 422 may include SLA rules that partially define operation of WAN link switching module 450 for SD-WAN application 406, routes, and virtual routing and forwarding instances (VRFs) configured with interfaces for WAN links, interfaces configurations that specify link type (IP, MPLS, mobile, etc.), priority, maximum bandwidth, encapsulation information, type of overlay tunnel, and/or other link characteristics. In some aspects, SD-WAN edge 408 may receive local policy 422 from an external source such as network analysis system 124, 300 (FIGS. 1 and 3). In some aspects, local policy 422 may be generated by SD-WAN edge 408 as further described below.

Routing process 428 executes routing protocols to exchange routing information (e.g., routes) with other network devices and uses the routing information collected in routing table(s) 416 to select the active route to each destination, which is the route used by SD-WAN edge 408 to forward incoming packets to that destination. To route traffic from a source host to a destination host via SD-WAN edge 408, SD-WAN edge 408 learns the path that the packet is to take. These active routes are inserted into the forwarding table 418 of SD-WAN edge 408 and used by the forwarding plane hardware for packet forwarding. For example, routing process 428 may generate forwarding table 418 in the form of a radix or other lookup tree to map packet information (e.g., header information having destination information and/or a label stack) to next hops and ultimately to interfaces 432 for output. In some examples, SD-WAN edge 408 may have a physically bifurcated control plane and data plane in which a switching control card manages one or more packet forwarding line cards each having one or more high-speed packet processors.

SD-WAN edge 408 executes SD-WAN application 406 to implement an SD-WAN service, such as SD-WAN service 101 of FIG. 1. SD-WAN application 406 causes SD-WAN edge 408 to forward traffic based on application flows. SD-WAN application 406 may identify packets of different application flows packets using packet characteristics. Once an application is identified using initial packet(s), information for identifying traffic for application sessions may be stored in flow tables for faster processing. WAN link switching module 450 selects WAN links to assign applications according to routing information, policy information, performance data, and service characteristics of the WAN links for an SD-WAN service implemented by SD-WAN application 406. SD-WAN application 406 may program forwarding table 418 with selected WAN links for applications, flow table data, or other data for mapping application traffic to a selected WAN link. Although termed and described as an application, SD-WAN application 406 may represent one or more processes, scripts, utilities, libraries, or other programs for performing SD-WAN edge operations.

In some implementations, SD-WAN application 406 may optionally include policy generator 220, that, when present, can generate local policy 422. As described above with reference to FIG. 2, policy generator 220 can include AI engine 222. AI engine 222 can receive and analyze WAN link characterization data 218 determined or received by SD-WAN edge device 408 and process the WAN link characterization data 218 using machine learning model 224 to generate local policy 422. As discussed above, machine learning model 224 can be a model that has been previously trained to generate local policies such as local policy 422. In some cases, aspects of any of AI engine 222 and ML model 224 may be provided off-device from SD-WAN edge 408 by a remote service (e.g., network analysis system 124, 300). In such examples, SD-WAN application 406 may pull the local policy from the remote service, or the remote service may push local policy 422 to SD-WAN application 406.

Local policy 422 may define criteria for WAN link selection by SD-WAN 406. In some aspects, the criteria may be expressed as rules, parameters, and thresholds that determine how an application is assigned to a WAN link. SD-WAN edge 408 may use the criteria to assign applications to WAN links. As an example, a high priority application may be assigned to a high priority link, while lesser priority applications may be assigned to lesser priority links. Applications and application sessions may be assigned to WAN links based on application characteristics and WAN link characteristics. As described above, machine learning model 224 may include WAN path signatures that may be generated from WAN link characterization data 218. The WAN path signatures may identify different features of a WAN path. Applications and services may be assigned to WAN links based on the WAN path signatures. For example, an application or service that requires low latency and low bandwidth may be assigned to a WAN link on a path having a signature indicating the path can provide low latency. An application or service that needs high bandwidth may be assigned to a WAN link on a path having a signature indicating that the path can provide high bandwidth.

Figure 5A:
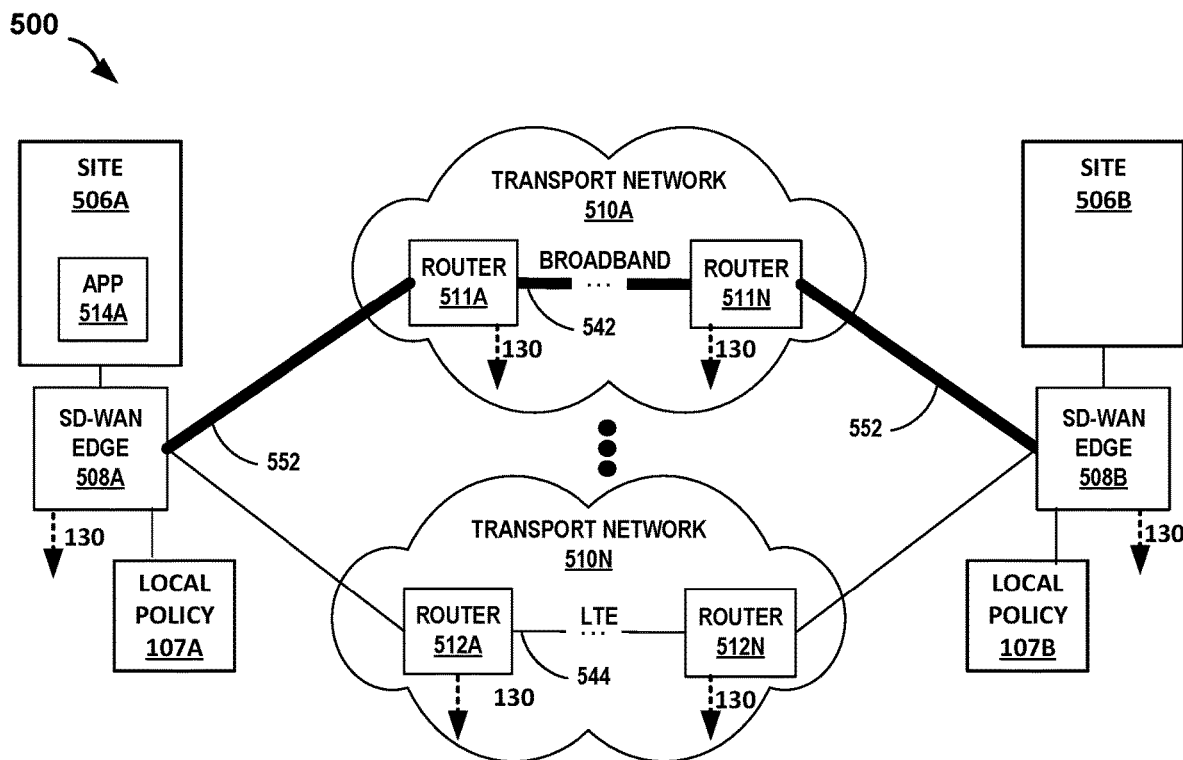
FIGS. 5A and 5B are block diagrams illustrating conceptual views of WAN link selection based on local policies, according to techniques described in this disclosure.
Figure 5A:
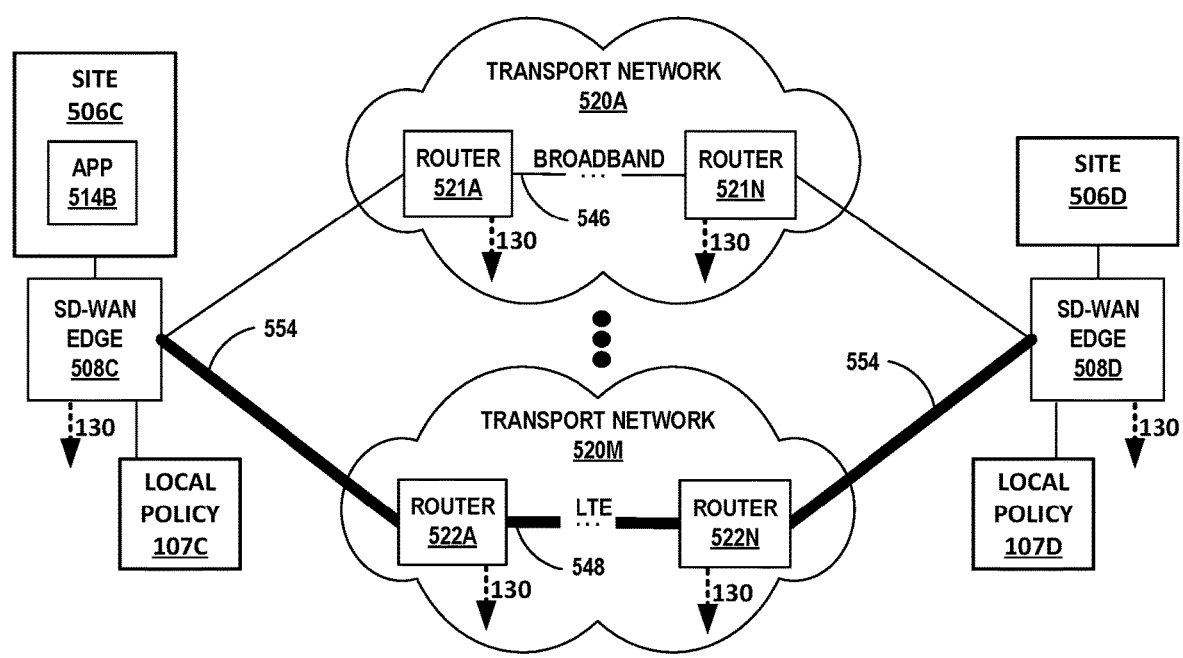
Figure 5B:
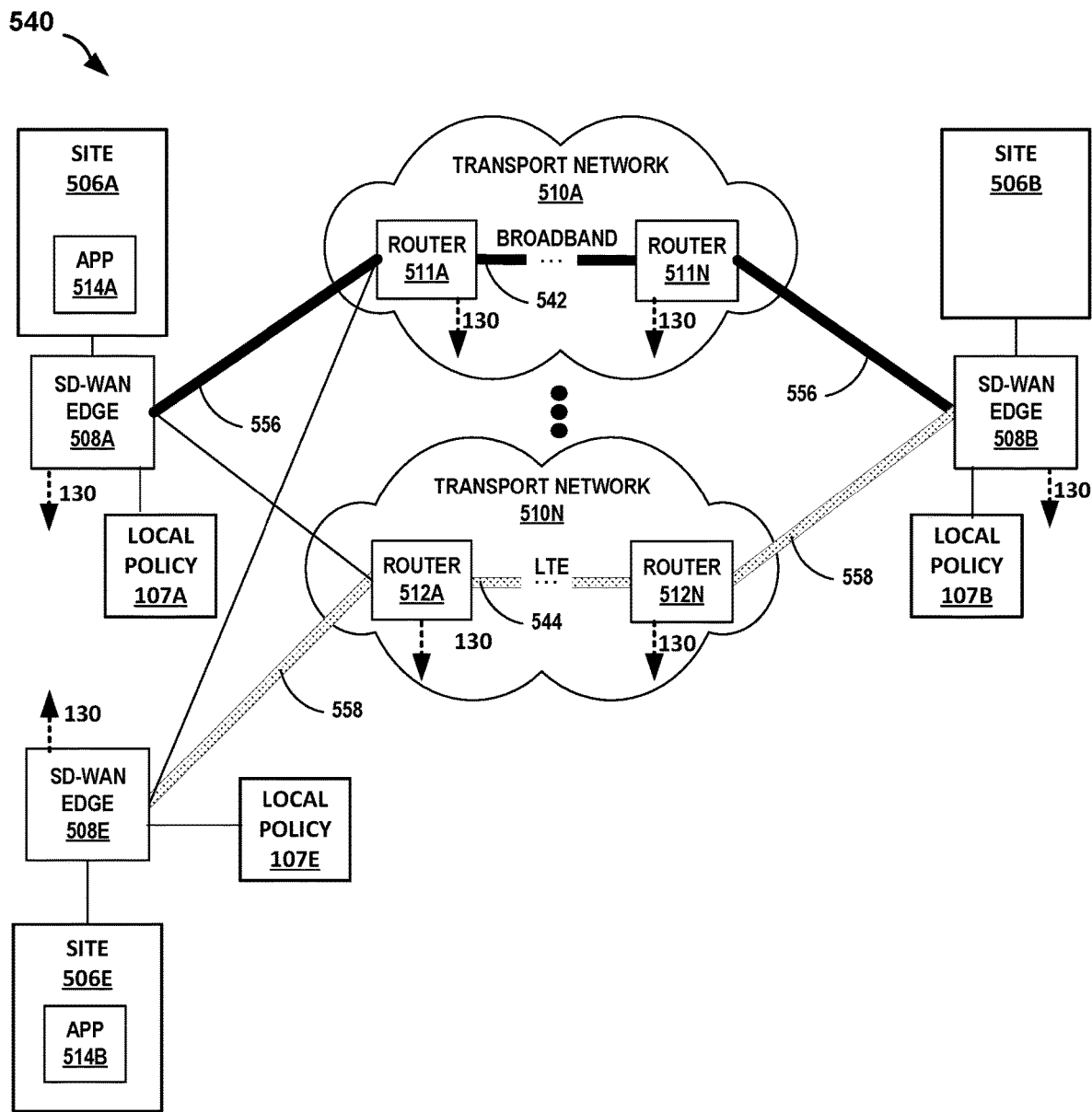

FIGS. 5A and 5B are block diagram illustrating conceptual views of WAN link selection based on local policies, according to techniques described in this disclosure. FIG. 5A illustrates a conceptual view of WAN link selection for WAN links according to local policies in an example scenario where the sites may be a great distance apart such that the set of transport networks used by some sites may be provided by a different set of network service providers than a set of transport networks used by other sites. FIG. 5B illustrates a conceptual view of WAN link selection for WAN links according to local policies in an example scenario where the sites are in different locations, but have the same set (or similar set) of transport networks available for use.

FIG. 5A is a block diagram illustrating conceptual views of WAN link selection based on local policies, according to techniques described in this disclosure. FIG. 5A illustrates an example portion 500 of a network system such as example network system 100 of FIG. 1, and includes sites 506A-506D having SD-WAN edges 508A-508D respectively. SD-WAN edge 508 can be the same as, or similar to, an SD-WAN edge device 108, 300 discussed above with respect to FIGS. 1 and 3. Network portion 500 includes transportation networks 510A-510N and 520A-520M.

Transport networks 510A-510N can be any one or more of transport networks 110A-110N discussed above with respect to FIG. 1. Transport networks 520A-520M may be similar to networks 510A-510N, but may be provided by different network service providers. For example, sites 508A and 508B may be geographically distant from sites 508C and 508D and the network service providers available to sites 508A and 508B may be different from the network service providers available to sites 508C and 508D. In this example, transportation network 510A includes broadband routers 511A-511N communicatively coupled via broadband network 542. Transportation network 510N includes LTE routers 512A-512N communicatively coupled via LTE network 544. Transportation network 520A includes broadband routers 521A-521N communicatively coupled via broadband network 546. Transportation network 520M includes LTE routers 522A-522N communicatively coupled via LTE network 548.

SD-WAN edges 508A-508D, broadband routers 511A-511N, LTE routers 512A-512N, broadband routers 521A-521N, and LTE routers 522A-522N may provide WAN link characterization data 130 to a network analysis system 124, 300 and/or SD-WAN controller 104 (FIGS. 1 and 3). Routers 511, 512, 521, and 522 may be collectively referred to as "intermediate routers" or "transport network routers," in that such routers are not edge routers for the WAN links of network system 100 but instead transport application packets across the transport networks 510, 520 as part of the underlay. SD-WAN edge 508A of site 506A can communicate with SD-WAN edge 508B of site 506B using any one or more of transport networks 510A-510N. SD-WAN edge 508C of site 506C can communicate with SD-WAN edge 508D of site 506D using any one or more of transport networks 520A-520M.

In the example illustrated in FIG. 5A, each of local policies 107A-107D may have initially been a copy of or otherwise generated based on a global policy (e.g., global policy 109, FIG. 1). In some aspects, local policies 107A-107D may be adjusted (i.e., modified) as described herein by a policy generator of a network analysis system 124, 300 (FIGS. 1 and 3). In some aspects, local policies 107A-107D may be adjusted as described herein by policy generators on SD-WAN edge 508A-508D or computing devices of sites 506A-506D respectively. In some aspects, an initial local policy may be created by a policy generator of network analysis system 124, and then periodically updated by respective policy generators on SD-WAN edge 508A-508D or computing devices of sites 506A-506D. As a result of the adjustments, each of local policies 107A-107D may have rules, parameters and/or thresholds that differ from one another.

In this way, an operator for a large number of sites can create a global policy for its network that the network analysis system 124 can adjust to account for diverse local conditions (e.g., network conditions, application services, WAN link types available and characteristics thereof). Network analysis system 124 may in some cases aggregate data from multiple different sites that have similar characteristics and experience similar conditions. Such sites should have a similar local policy to implement the global policy. For example, all sites in a particular city or otherwise geographically proximate may be expected to experience similar network conditions for a transport network for WAN links for such sites. As such, network analysis system 124 may incorporate location data for sites when generating local policies.

Network analysis system 124 may operate on a longer time horizon as compared to existing SD-WAN path selection. For instance, a broadband transport network may experience persistent degradation of performance over many weeks. This may cause network analysis system 124 to update local policies for sites connected to the broadband transport network.

In the example illustrated in FIG. 5A, site 506A and site 506C each execute the same application, with site 506A executing application 514A and site 506C executing application 514B. SD-WAN edge 508A of site 506A has applied local policy 107A to route network traffic for application 514A via a network path over transportation network 510A that includes broadband routers 511A-511N of broadband network 542. This network path is indicated in FIG. 5A using bolded lines. In this example, local policy 107A may have rules, parameters, thresholds and/or network path signatures that cause SD-WAN edge 508A to select transportation network 510A for network traffic associated with application 514A. For example, transportation network 510A may have better performance, lower cost, a better price/performance ratio, or have an associated path signature that is a better match to application 514A than other networks 510B-510N.

SD-WAN edge 508C of site 506C has applied local policy 107C to route network traffic for application 514B via a network path over transportation network 520M that includes LTE routers 522A-52N of LTE network 548. This network path is indicated in FIG. 5A using bolded lines. In this example, local policy 107C may have rules, parameters, thresholds and/or network path signatures that cause SD-WAN edge 508C to select a WAN link that traverses transportation network 520M for network traffic associated with application 514A. For example, transportation network 520M may have better performance for site 506C, lower cost for site 506C, a better price/performance ratio for site 506C, or have an associated path signature that is a better match to application 514B than other networks 520A-510(M−1) for site 506C. At other sites, however, another one of transportation networks 520 may be better with respect to the above considerations, which may be due in part to local conditions of transport network 520M at the various sites, at various dates/times, which conditions are characterized in historical WAN link characterization data 208 used to train the ML model 224.

Assume that a global policy for the subscriber operating sites 506A-506D specified that broadband networks were to be selected over LTE networks on the assumption that broadband networks provide better performance at a lower cost than LTE networks. In existing systems, SD-WAN edge 506C of site 506C may select a suboptimal network path due to the lack of ability to customize policies for specific sites.

FIG. 5B is a block diagram illustrating conceptual views of WAN link selection based on local policies, according to techniques described in this disclosure. The example illustrated in FIG. 5B is similar to that of FIG. 5A with respect to sites 508A and 508B. The example illustrated in FIG. 5B also includes site 506E that can be communicatively coupled to site 506B via transport networks 510A-510N. In this example, sites 506A, 506B and 506E may be in a relatively closer geographic area than in the example illustrated in FIG. 5A.

Local policy 107E, like local policies 107A and 107B may have initially been a copy of or otherwise generated based on a global policy (e.g., global policy 109, FIG. 1), and adjusted as described herein by a policy generator of a network analysis system 124, 300 (FIGS. 1 and 3), SD-WAN edge 508E or a computing devices of site 506E.

In the example illustrated in FIG. 5B, site 506A and site 506E each execute the same application, with site 506A executing application 514A and site 506E executing application 514C. SD-WAN edge 508A of site 506A has applied local policy 107A to route network traffic for application 514A via a network path over transportation network 510A that includes broadband routers 511A-511N of broadband network 542. This network path is indicated in FIG. 5A using bolded lines. In this example, local policy 107A may have rules, parameters, thresholds and/or network path signatures that cause SD-WAN edge 508A to select transportation network 510A for network traffic associated with application 514A. For example, transportation network 510A may have better performance, lower cost, a better price/performance ratio, or have an associated path signature that is a better match to application 514A than other networks 510B-510N.

SD-WAN edge 508E of site 506C has applied local policy 107E to route network traffic for application 514C via a network path over transportation network 510N that includes LTE routers 512A-512N of LTE network 544. This network path is indicated in FIG. 5B using dot filled lines. In this example, local policy 107E may have rules, parameters, thresholds and/or network path signatures that cause SD-WAN edge 508E to select a WAN link that traverses transportation network 510N for network traffic associated with application 514E. Although sites 506A and 506E share the same transportation networks 510A-510N, local conditions at site 506E may result in transportation network 510N having better performance for site 506E, lower cost for site 506E, a better price/performance ratio for site 506E, or have an associated path signature that is a better match to application 514C than other networks 510A-510(N-1). At other sites, however, another one of transportation networks 510 may be better with respect to the above considerations, which may be due in part to local conditions of transport network 510N at the various sites, at various dates/times, which conditions are characterized in historical WAN link characterization data 208 used to train the ML model 224.

Figure 6:
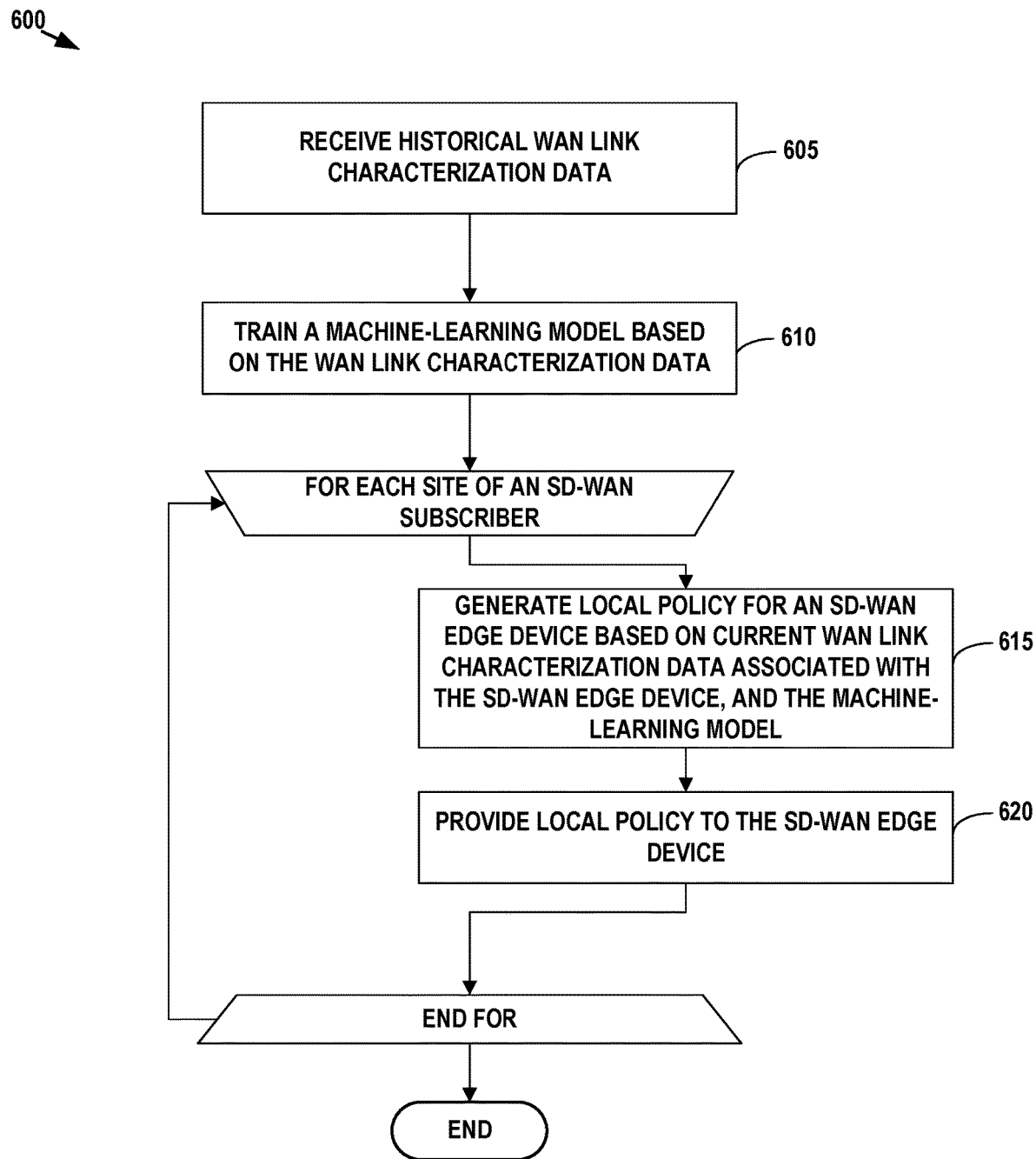
FIG. 6 is a flowchart illustrating operations for a method for generating local policies for SD-WAN subscriber sites according to techniques disclosed herein.

FIG. 6 is a flowchart illustrating operations for a method for generating local policies for SD-WAN subscriber sites according to techniques disclosed herein. In some aspects, the method includes receiving, by a training system, historical WAN link characterization data (605). The training system trains a machine learning model based on the WAN link characterization data and policy parameters in effect at the time the WAN link characterization data was collected (610). For each site of multiple sites for an SD-WAN subscriber having a SD-WAN service, a policy generator generates a local policy for an SD-WAN edge device of the site based on current WAN link characterization data for the site and the machine learning model (615). The policy generator may be a centralized policy generator, for example, at a network analysis system. In some aspects, the policy generator may be local to the site, for example, at the SD-WAN edge device or a computing device at the site. The local policy can be provided to the SD-WAN edge device by the policy generator (620). The SD-WAN edge devices apply the local policies when performing WAN link selection for the SD-WAN service.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. Non-transitory computer-readable storage media comprising instructions that, when executed, configure processing circuitry of a computing system to:
receive wide area network (WAN) link characterization data for a plurality of WAN links of a software-defined WAN (SD-WAN) system over a time period; and
for each site of a plurality of sites of the SD-WAN system, generate a local policy for the site based on a global policy comprising one or more rules and applicable to all of the plurality of sites and a machine learning model trained with the WAN link characterization data for the plurality of WAN links, and
provide the local policy to an SD-WAN edge device of the site.

2. The non-transitory computer-readable storage media of claim 1, wherein the instructions that configure processing circuitry of the computing system to generate the local policy for the site comprise instructions that configure processing circuitry of the computing system to generate, based on the machine learning model, one or more customized versions of rules of the global policy for inclusion in the local policy.

3. The non-transitory computer-readable storage media of claim 1, wherein the instructions that configure processing circuitry of the computing system to generate the local policy comprise instructions that configure processing circuitry of the computing system to generate the local policy based on a location corresponding to the SD-WAN edge device.

4. The non-transitory computer-readable storage media of claim 1, wherein the machine learning model is trained with policy parameters being applied at a time the WAN link characterization data was collected.

5. The non-transitory computer-readable storage media of claim 1, wherein the WAN link characterization data includes one or more of an amount of jitter, an amount of latency, a time to first packet, an amount of packet loss, and a maximum transmission unit (MTU) for each of the plurality of WAN links.

6. The non-transitory computer-readable storage media of claim 5, wherein the WAN link characterization data includes an amount of packet loss, the non-transitory computer-readable storage media further comprising instructions that, when executed, configure processing circuitry of a computing system to:
 determine the packet loss based on determining a number of packets transmitted by the SD-WAN edge device that did not reach destination devices specified in the packets.

7. The non-transitory computer-readable storage media of claim 1, further comprising instructions that, when executed, configure processing circuitry of a computing system to:
 train the machine learning model based on historical WAN link characterization data received over a time period.

8. The non-transitory computer-readable storage media of claim 1, wherein the instructions that configure processing circuitry of the computing system to generate the local policy for the site comprise instructions that configure processing circuitry of the computing system to generate a corresponding service policy for each service of one or more services.

9. The non-transitory computer-readable storage media of claim 8, wherein the corresponding service policy specifies selection criteria for at least one of a network path or a service level assurance parameter.

10. The non-transitory computer-readable storage media of claim 1, wherein the local policy includes a rule to determine whether to reassign an application or service from a first WAN link associated with the SD-WAN edge device to a second WAN link associated with the SD-WAN edge device, wherein the rule includes a Quality of Experience (QoE) parameter or a cost factor associated with each of the first WAN link and the second WAN link.

11. The non-transitory computer-readable storage media of claim 10, further comprising instructions that, when executed, configure processing circuitry of a computing system to:
 optimize the QoE parameter and the cost factor associated with each of the first WAN link and the second WAN link.

12. The non-transitory computer-readable storage media of claim 1, wherein the local policy includes a rule to select a network path based on a path signature associated with the network path corresponding to one or more service network characteristics.

13. A software-defined wide area network (SD-WAN) system comprising processing circuitry in communication with memory and configured to:
 receive WAN link characterization data for a plurality of WAN links of the SD-WAN system over a time period, and
 for each site of a plurality of sites of the SD-WAN system, generate a local policy for the site based on a global policy comprising one or more rules and applicable to all of the plurality of sites and a machine learning model trained with the WAN link characterization data for the plurality of WAN links, and
 provide the local policy to an SD-WAN edge device of the site.

14. The SD-WAN system of claim 13, wherein the processing circuitry is configured to generate, based on the machine learning model, one or more customized versions of rules of the global policy for inclusion in the local policy.

15. The SD-WAN system of claim 13, wherein the processing circuitry is configured to generate the local policy based on a location corresponding to the SD-WAN edge device.

16. The SD-WAN system of claim 13, wherein the WAN link characterization data includes one or more of an amount of jitter, an amount of latency, a time to first packet, an amount of packet loss, and a maximum transmission unit (MTU) for each of the plurality of WAN links.

17. The SD-WAN system of claim 13, wherein the machine learning model is trained based on historical WAN link characterization data received over a time period.

18. The SD-WAN system of claim 13, wherein the local policy includes a rule to determine whether to reassign an application or service from a first WAN link associated with the SD-WAN edge device to a second WAN link associated with the SD-WAN edge device, wherein the rule includes a Quality of Experience (QoE) parameter or a cost factor associated with each of the first WAN link and the second WAN link.

19. Non-transitory computer-readable storage media comprising instructions that, when executed, configure processing circuitry of a software-defined wide area network (SD-WAN) edge device to:
 receive, from a network analysis system, a machine learning model trained with WAN link characterization data for a plurality of WAN links of a plurality of sites;
 generate a local policy for the SD-WAN edge device based on the machine learning model; and
 assign, based on the local policy, a service or application of the SD-WAN edge device to a WAN link of a plurality of WAN links associated with the SD-WAN edge device.

20. The non-transitory computer-readable storage media of claim 19, wherein the local policy includes a rule to determine whether to reassign the service or application from a first WAN link of the plurality of WAN links associated with the SD-WAN edge device to a second WAN link of the plurality of WAN links associated with the SD-WAN edge device, wherein the rule includes a Quality of Experience (QoE) parameter or a cost factor associated with each of the first WAN link and the second WAN link.

* * * * *